(12) United States Patent
Tuller

(10) Patent No.: US 10,993,413 B2
(45) Date of Patent: May 4, 2021

(54) APPARATUS, SYSTEM AND METHOD FOR DRYING PETS

(71) Applicant: Paul Tuller, Long Island City, NY (US)

(72) Inventor: Paul Tuller, Long Island City, NY (US)

(*) Notice: Subject to any disclaimer, the term of this patent is extended or adjusted under 35 U.S.C. 154(b) by 320 days.

(21) Appl. No.: 16/003,372

(22) Filed: Jun. 8, 2018

(65) Prior Publication Data

US 2018/0352783 A1  Dec. 13, 2018

Related U.S. Application Data

(60) Provisional application No. 62/518,147, filed on Jun. 12, 2017.

(51) Int. Cl.
*A01K 13/00* (2006.01)
*A46B 5/04* (2006.01)
*A46B 15/00* (2006.01)

(52) U.S. Cl.
CPC .............. *A01K 13/001* (2013.01); *A46B 5/04* (2013.01); *A46B 15/003* (2013.01); *A46B 2200/1093* (2013.01)

(58) Field of Classification Search
CPC ................ A01K 13/001; A01K 13/002; A46B 2200/1093; A46B 5/04; A46B 15/003; A45D 20/12; A45D 20/122; A45D 20/48; A45D 20/50; A45D 20/52; A45D 20/525; A45D 20/00; A45D 20/04
See application file for complete search history.

(56) References Cited

U.S. PATENT DOCUMENTS

| | | | | |
|---|---|---|---|---|
| 3,574,885 A | * | 4/1971 | Jones | A46B 9/02 15/393 |
| 4,766,914 A | * | 8/1988 | Briggs | A45D 20/00 132/212 |
| 5,524,575 A | * | 6/1996 | Lennon | A01K 13/002 119/625 |
| 5,526,578 A | * | 6/1996 | Iyer | A45D 20/10 239/443 |
| 5,546,674 A | * | 8/1996 | Lange | A45D 20/50 34/97 |
| 5,768,748 A | * | 6/1998 | Silvera | A01K 13/001 119/602 |
| 6,109,214 A | * | 8/2000 | Rampersad | A46B 5/04 119/600 |
| 10,791,814 B2 | * | 10/2020 | Masterson | A45D 20/122 |
| 2006/0225665 A1 | * | 10/2006 | Roman-Barcelo | A01K 13/002 119/677 |
| 2013/0305998 A1 | * | 11/2013 | Brown | A01K 13/001 119/603 |
| 2016/0073611 A1 | * | 3/2016 | Hightower | A01K 13/001 119/603 |

* cited by examiner

*Primary Examiner* — Trinh T Nguyen
(74) *Attorney, Agent, or Firm* — Robert J. Yarbrough of Lipton, Weinberger & Husick

(57) ABSTRACT

An apparatus, a system and a method for drying pets include a blower that directs a flow of air through one or two tubes to one or two mitts. The one or two mitts receive the flow of air from the blower and direct the flow of air through perforations to dry the pet. The air may flow through tapered channels within the mitts.

9 Claims, 15 Drawing Sheets

APPARATUS, SYSTEM AND METHOD FOR DRYING PETS

I. BACKGROUND OF THE INVENTION

A. Field of the Invention

The present invention relates generally to a dryer apparatus, system and method for pets.

B. Statement of the Related Art

Pets become wet during a bath, during grooming, when rained upon outdoors, after swimming, and in other circumstances. It is desirable to dry the wet fur of such animals so that the animal is comfortable, for the health of the animal, and to prevent the animal from making the surrounding environment wet.

In order to dry pets, towels and hand-held electric hair dryers are often employed, alone or in conjunction. Use of a towel alone is not sufficient to completely dry an animal. Use of an electric hair dryer is generally problematic because one individual will have difficulty controlling a pet while simultaneously using the dryer because the individual must devote one hand to the dryer and one hand to the pet. Also, the effective coverage area of a hair dryer is small, requiring a long time to dry a pet and constant movement of the dryer to cover all of the fur.

II. SUMMARY OF THE INVENTION

The apparatus for drying pets comprises of one or more perforated mitts that are worn by a user. The mitts connect by one or more tubes to a heated blower. Warm air flows from the blower through the tubes to the mitts and out of the perforations in the mitts. A user can move his or her hands along the fur of the pet while wearing the mitts to dry the pet with the aid of the moving air exiting the perforations. Use of two mitts allows an individual to control the pet while simultaneously drying the fur of the pet.

III. BRIEF DESCRIPTION OF THE DRAWINGS

Embodiments will be described with reference to the following drawing figures, in which like numerals represent like items throughout the figures, and in which.

FIG. 13 D is a schematic perspective view of the underside of the drying portion.

Figure 14:
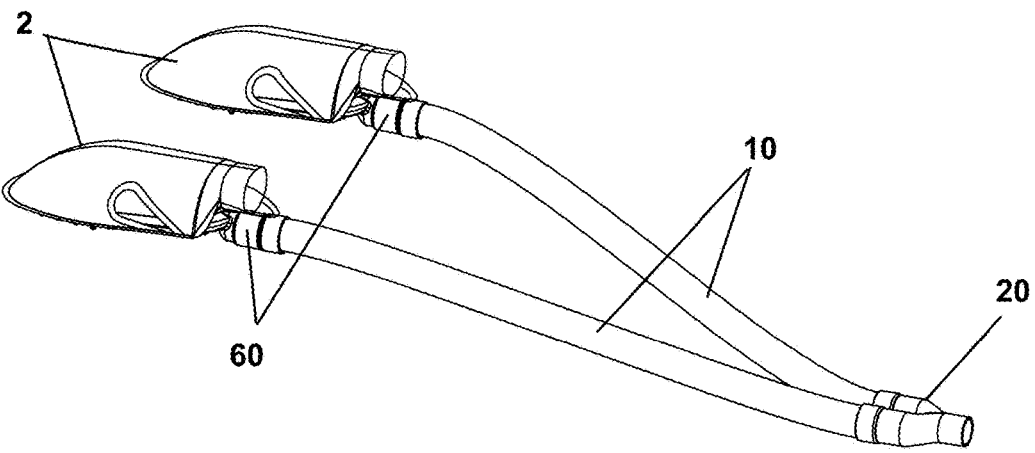

FIG. 14 is a perspective view of two mitts assembled to a tube.

Figure 15:
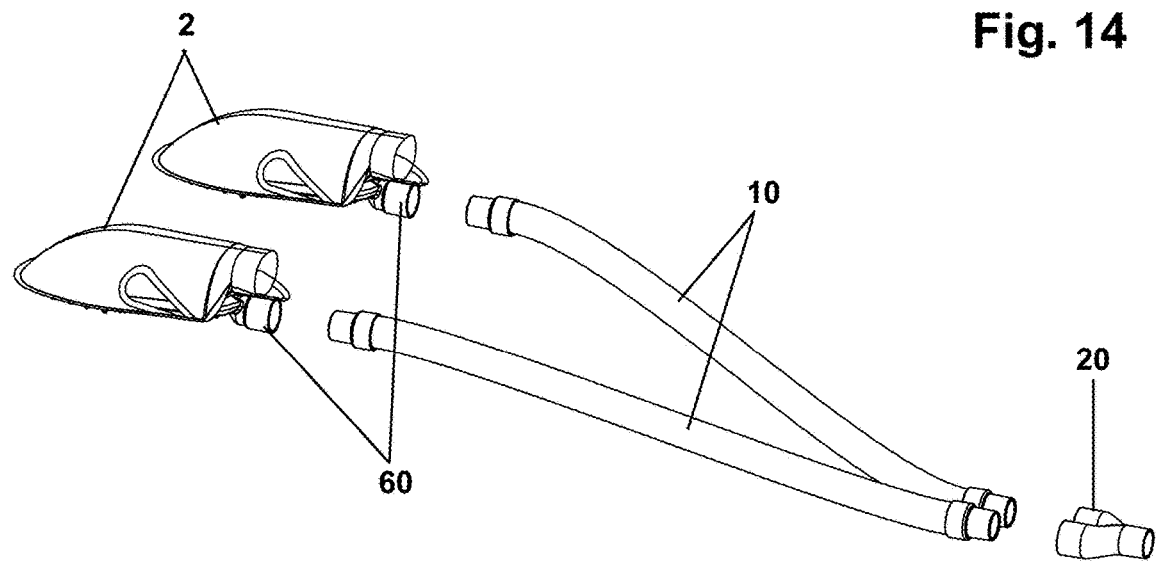

FIG. 15 is a perspective view of two mitts disassembled from a tube.

Figure 16:
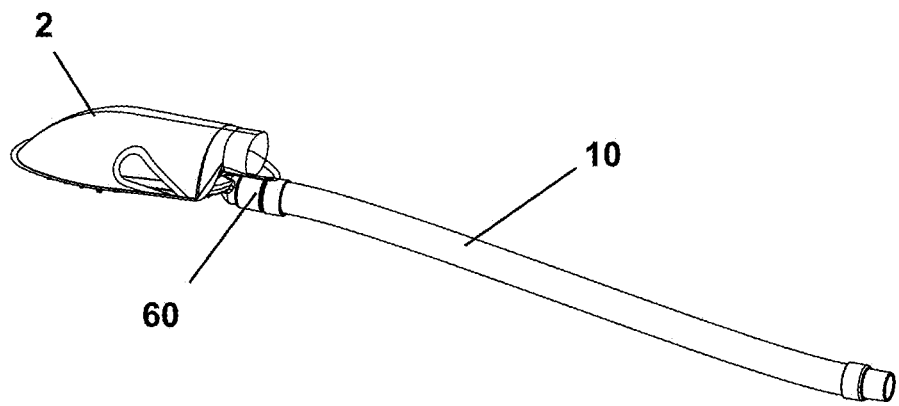

FIG. 16 is a perspective view of a single mitt assembled to a tube.

Figure 17:
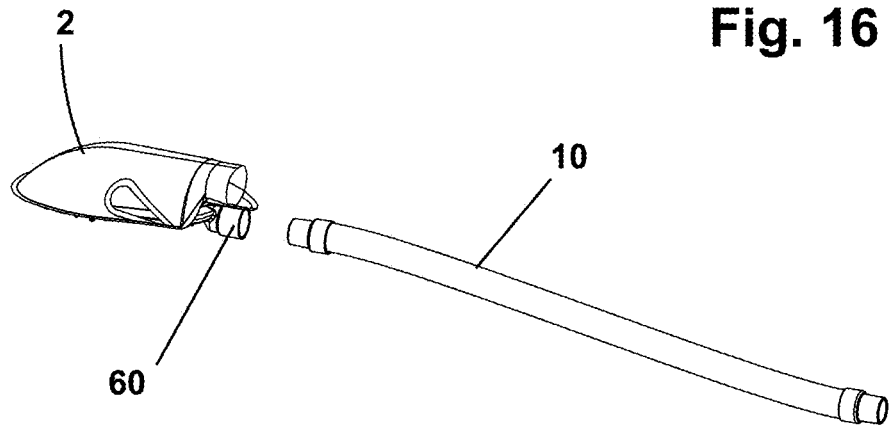

FIG. 17 is a perspective view of a single mitt disassembled from a tube.

IV. DESCRIPTION OF AN EMBODIMENT

Figure 1:
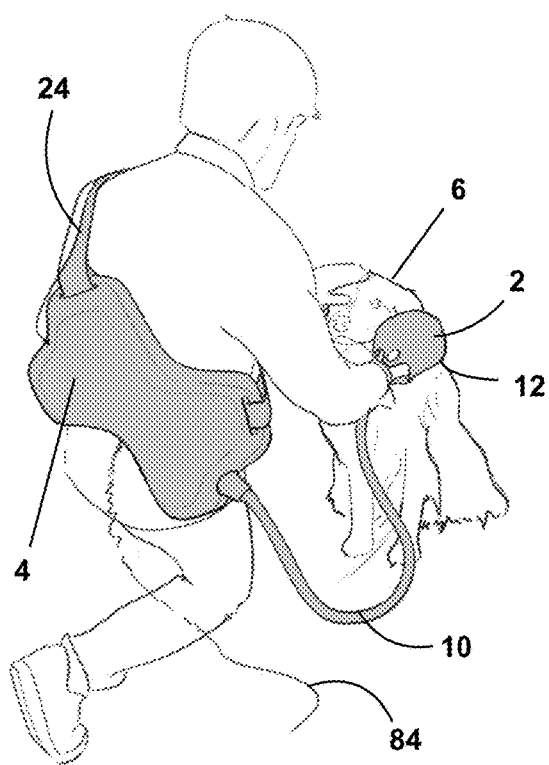
FIG. 1 is a view of the invention in use to dry a pet with the blower supported by a strap.
Figure 2:
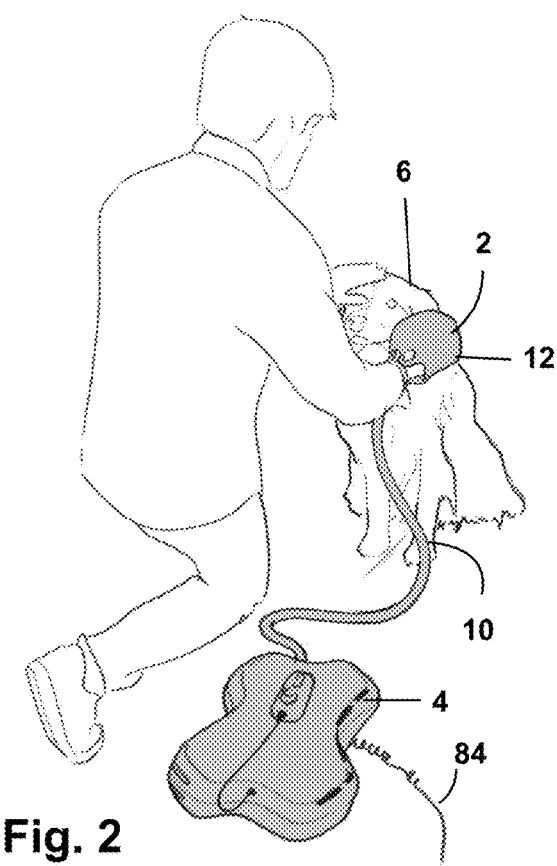
FIG. 2 is a view of the invention in use to dry a pet with the blower supported on a surface.

FIGS. 1 and 2 show a mitt 2 and blower 4 in use to dry a pet 6. The blower 4 propels air 8 through one or more tubes 10 to the mitt 2. The mitt 2 is wearable on the hand of a human user. The underside 12 of the mitt 2 includes perforations 14 through which the air 8 flows. The underside 12 of the mitt 2 and the perforations 14 are illustrated by FIGS. 13A through 13D. In use, the user passes the underside 12 of the mitt 2 over the fur or hair of the pet 6. The air 8 flowing through the perforations 14 dries the fur or hair of the pet 6. FIG. 1 illustrates that the blower 4 may be supported from the user's body by a strap 24. FIG. 2 shows that the blower 4 also may be supported by a surface, such as a floor. FIGS. 1 and 2 both show an embodiment in which the blower 4 supplies air 8 to a single mitt 2. The blower 4 also may supply air 8 to a pair of mitts 2 and the user may use a mitt 2 on each hand to dry the pet 6. FIGS. 14 and 15 show a connection for two mitts 2.

The blower 4 is powered by wall current or by a battery power supply, as is known in the art of portable electric motors. FIGS. 1 and 2 show a power cord 84 for wall current. The power supply and power connections are conventional and not otherwise shown.

Figure 3:
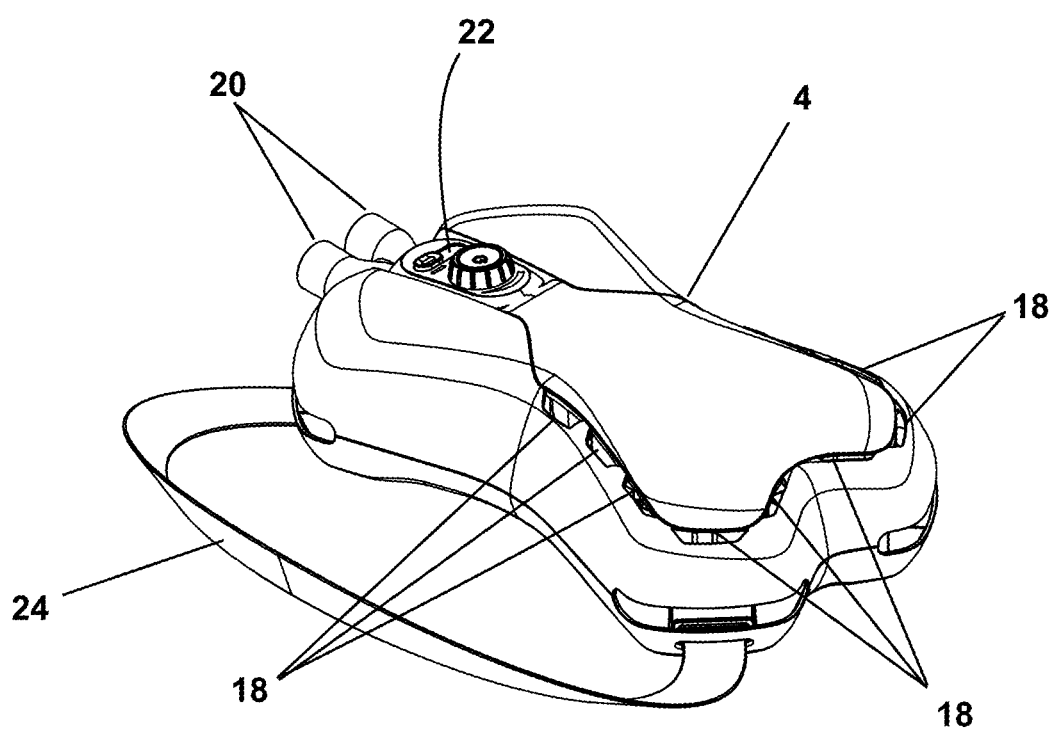
FIG. 3 is a perspective view of a blower for heated air.
Figure 4:
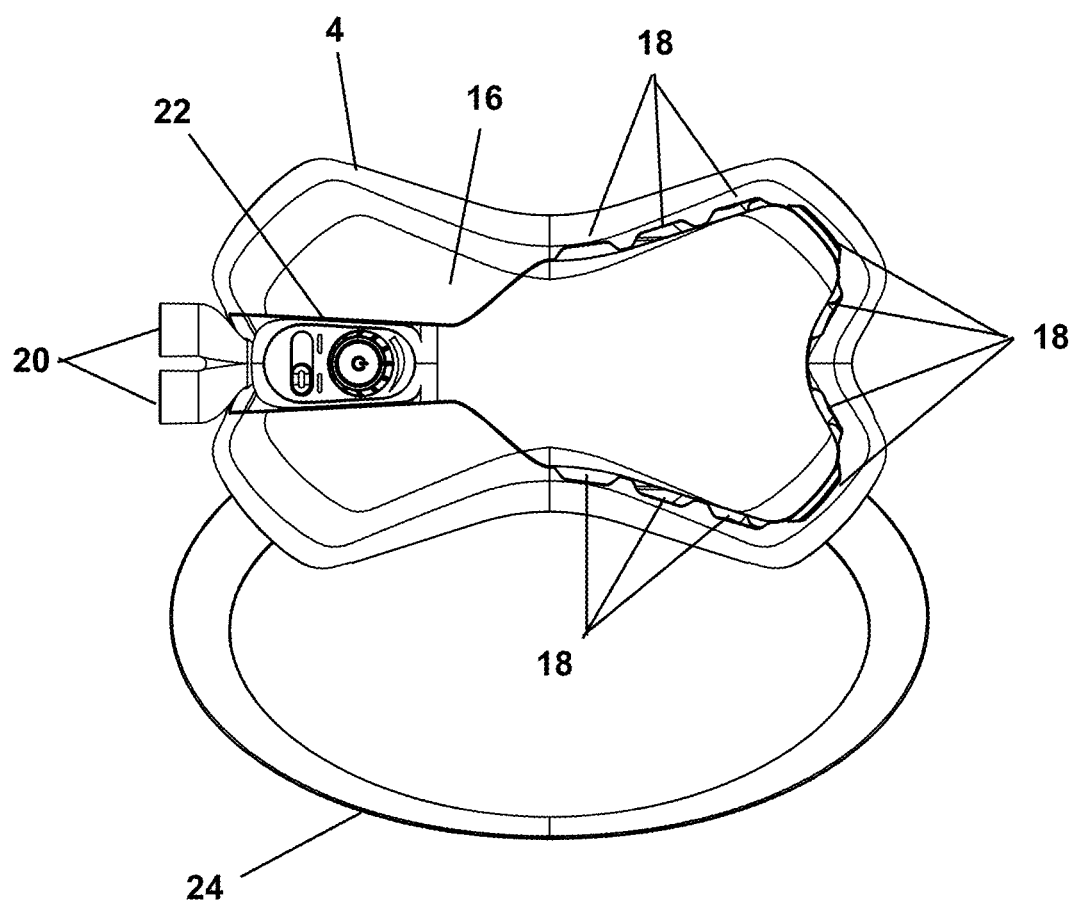
FIG. 4 is a top view of the blower.

FIGS. 3 through 9B illustrate the blower 4. FIGS. 3 and 4 show the top side 16 of the blower 4. Air 8 enters the blower 4 through inlets 18. The blower 4 expels the air 8 through the tube connections 20. A temperature and air speed control 22 allows the user to control the temperature and speed of the air 8 expelled through the tube connections 20. A strap 24 allows the user to conveniently carry the blower 4 on his or her person either when the blower 4 is in use or when storing or retrieving the blower 4.

Figure 5:
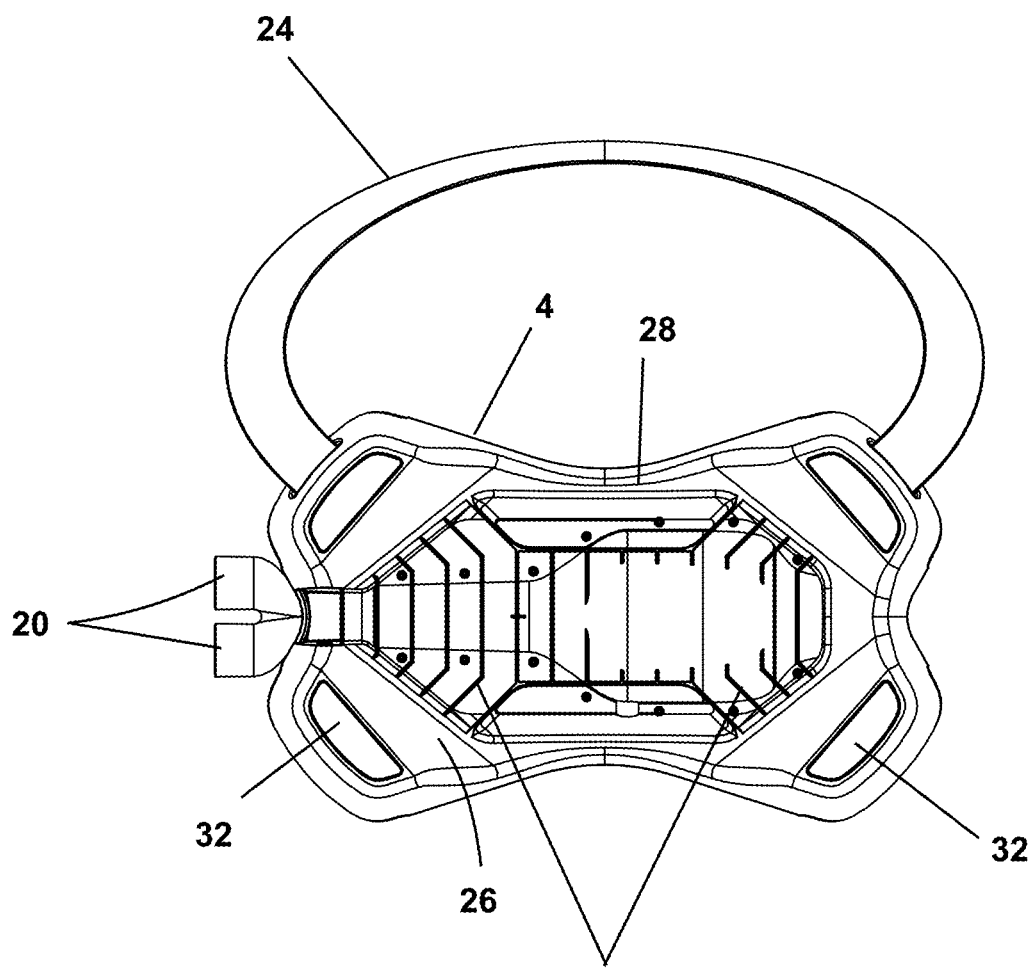
FIG. 5 is a bottom view of the blower.
Figure 6:
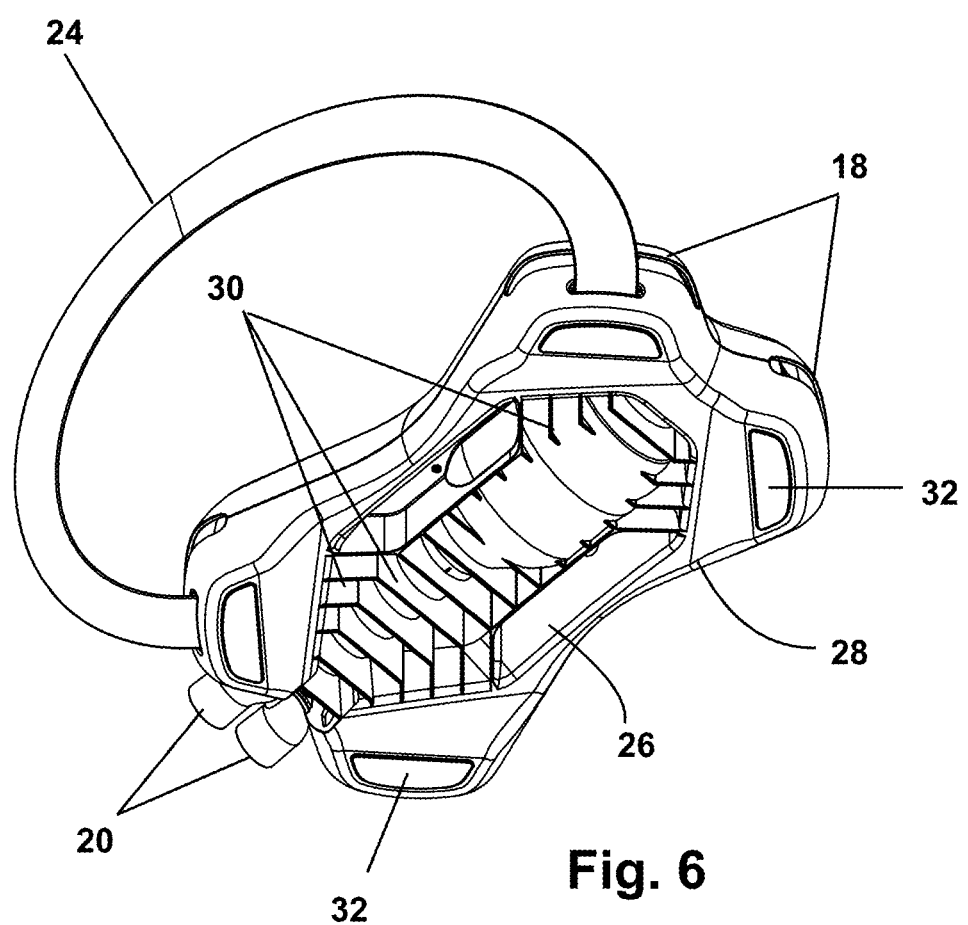
FIG. 6 is a bottom perspective view of the blower.

FIGS. 5 and 6 show the bottom side 26 of the blower 4. The blower 4 includes a motor and heater housing 28. In the embodiment of FIGS. 3 through 9B, the motor and heater housing 28 is composed of a polymer. Reinforcing ribs 30 defined by the polymer provide necessary stiffness and strength. Feet 32 support the blower 4 when the blower 4 is resting in an upright position on a surface.

Figure 7:
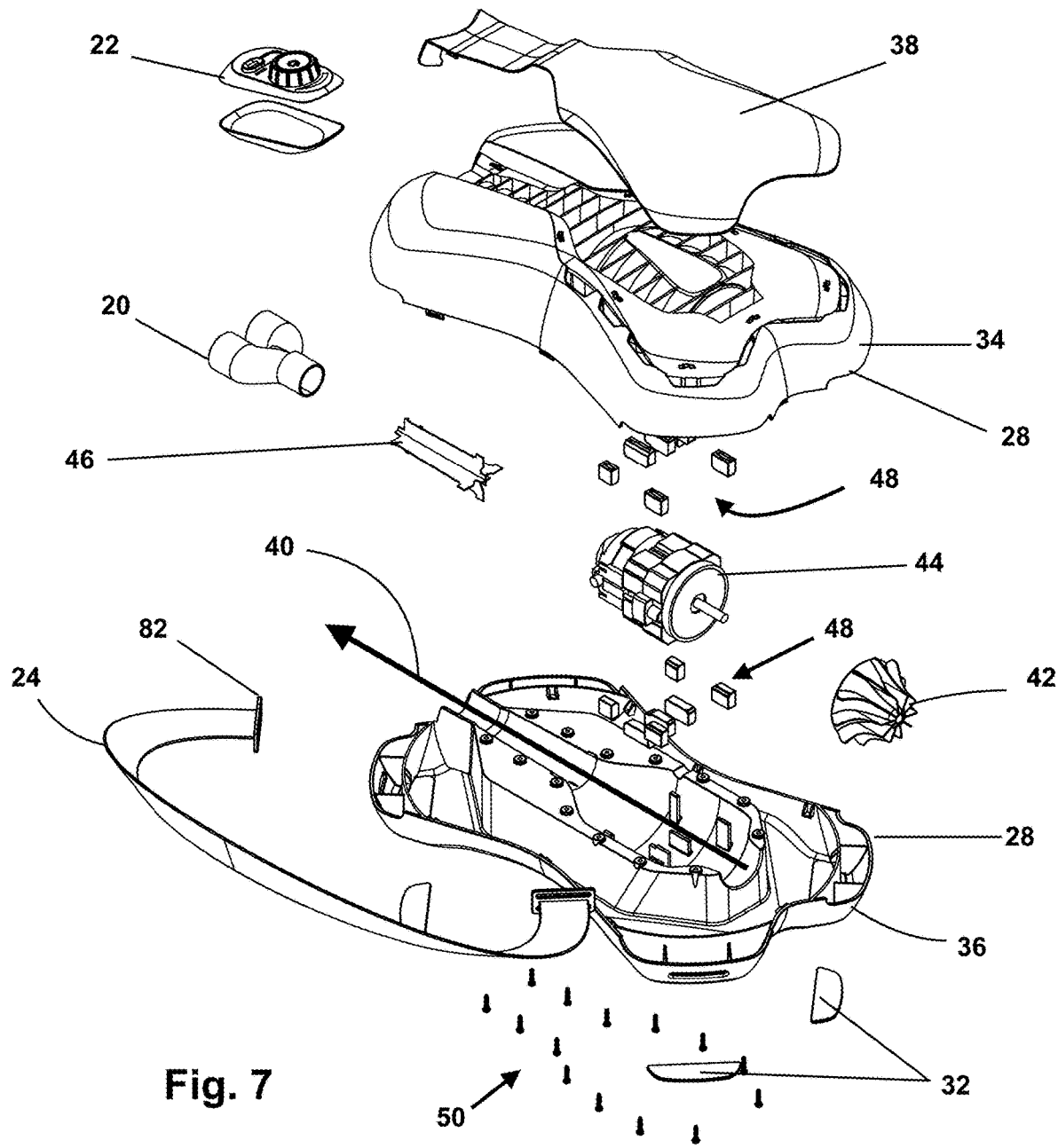
FIG. 7 is an exploded perspective view of the blower.
Figure 8:
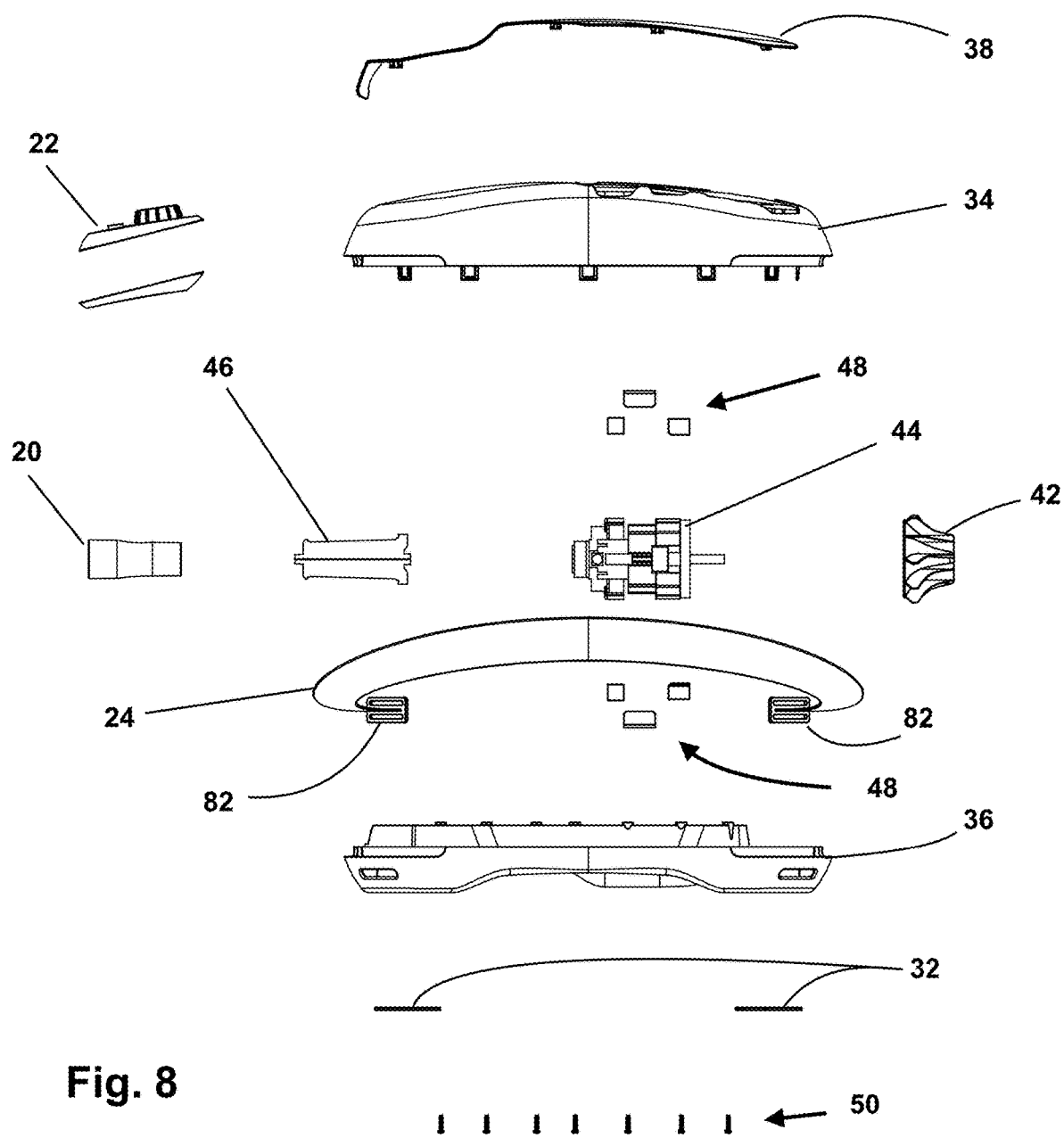
FIG. 8 is an exploded side view of the blower.

FIGS. 7 and 8 are exploded views of the blower 4. FIG. 7 is an exploded perspective view and FIG. 8 is an exploded side view. From FIGS. 7 and 8, the motor and heater housing 28 includes an upper portion 34 and a lower portion 36. A decorative trim panel 38 is disposed at the top of the upper portion 34.

The upper and lower portions 34, 36 of the motor and heater housing 28 define a flow path for air 8 through the blower 4. The flow path is indicated by arrow 40. An impeller 42 is attached to the drive shaft of an electric motor 44. The upper and lower portions 34, 36 support the electric motor 44 and impeller 42 and are disposed in the air flow path 40. The motor 44 drives the impeller 42, which propels air along the flow path 40. Also disposed in the air flow path 40 is an electrical resistance heating element 46. The heating element 46 selectably warms air 8 moving along the flow path 40. Both the motor 44 and the heating element 46 operate under the control of the motor and heater controller 22. The motor and heater controller 22 allows the user to select the speed of the motor 44 and hence the rate of flow of air 8 to and through the mitt 2. The motor and heater controller 22 also allows the user to select the amount of electrical energy provided to the resistance heater 46 and to thus control the temperature of the air 8 exiting the perforations 14 of the mitt 2. Resilient dampeners 48 are interposed between the motor and the upper and lower portions 34, 36 to reduce the vibration and noise of the motor 44 when the motor 44 is operating. Fasteners 50, such as screws, selectably hold the upper and lower portions 34, 36 of the motor and heater housing together.

FIGS. 1 and 3 through 9A illustrate a strap 24, with FIG. 1 showing that the strap 24 may support the blower 4 when the blower 4 is in use to dry a pet 6. The strap 24 is equipped with clips 82 to allow the strap to be selectably attached and detached from the blower 4. With the strap 24 detached, a surface such as a floor may support the blower as shown by FIG. 2. The clips 82 may be composed of any suitable material, such as a metal or a polymer.

Figure 9A:
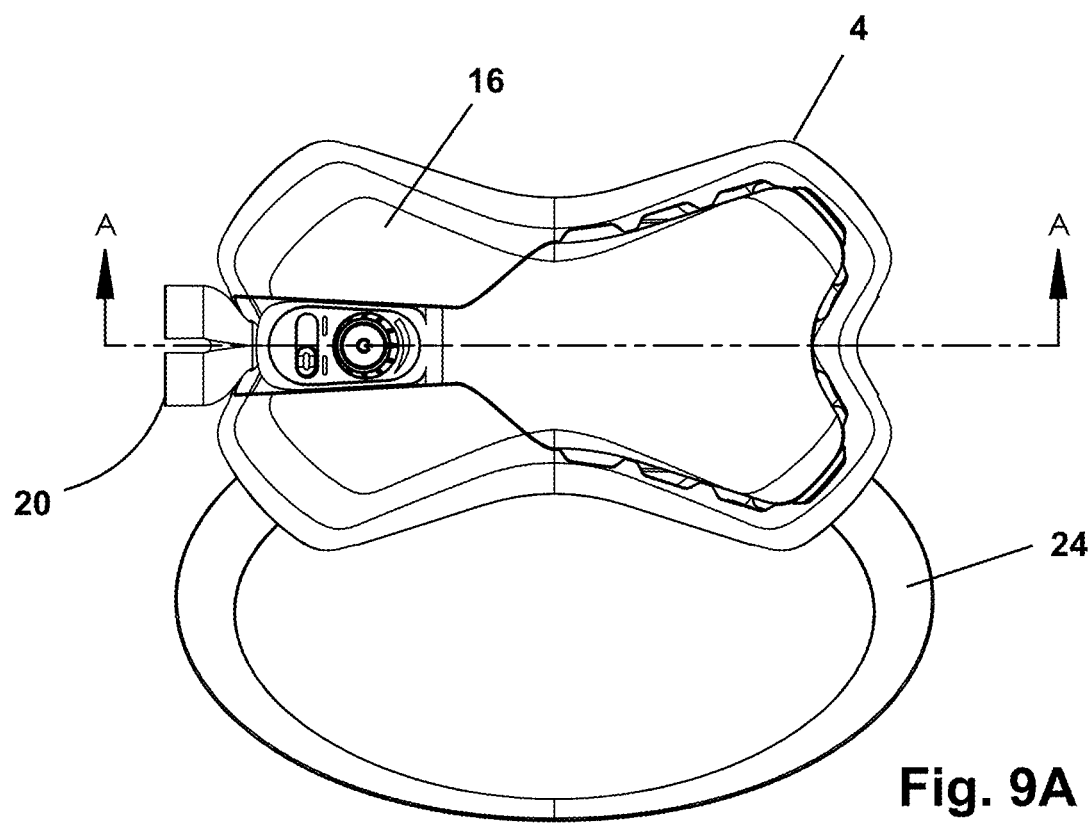
FIG. 9A is a top view of the blower showing section line A-A.
Figure 9B:
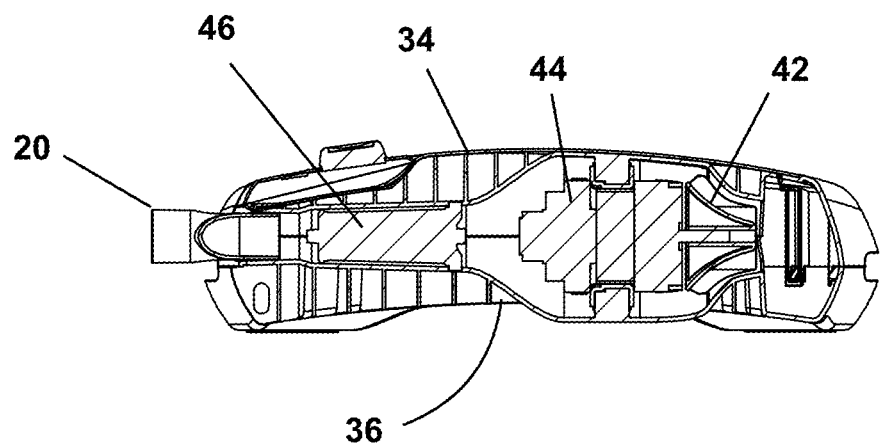
FIG. 9B is a section view of the blower along section line A-A.

FIG. 9B is a cross section of the blower 4 along section line A-A, shown by the blower 4 top view of FIG. 9A. The cross section of FIG. 9B shows the impeller 42, motor 44, heating element 46 and tube connections 20 in line. Those elements are aligned with the air flow path 40 shown by FIG. 7.

FIGS. 3 through 9B show a tube connection 20 for simultaneous use of two mitts 2 to dry a pet 6. The blower 4 selectably receives and retains the tube connection 20. The tube connection 20 splits the flow of air 8 into two flows of air 8 and is selectably attachable to two tubes 10, as shown by FIGS. 14 and 15. Alternatively, the user may dispense with the tube connection 20 and connect a single tube 10 directly to the blower 4. FIGS. 16 and 17 show the single tube 10 and single mitt 2. The single tube 10 and single mitt 2 may connect directly to the blower 4, as shown by FIGS. 1 and 2.

FIGS. 10 through 17 show the construction of the mitts 2, tubes 10 and generally the system outside of the blower 4. The hand-engaging portion 52 of the mitts 2 may take any suitable form, such as the shape of a mitten, a glove, or the open thumb mitt of FIG. 10.

Figure 10:
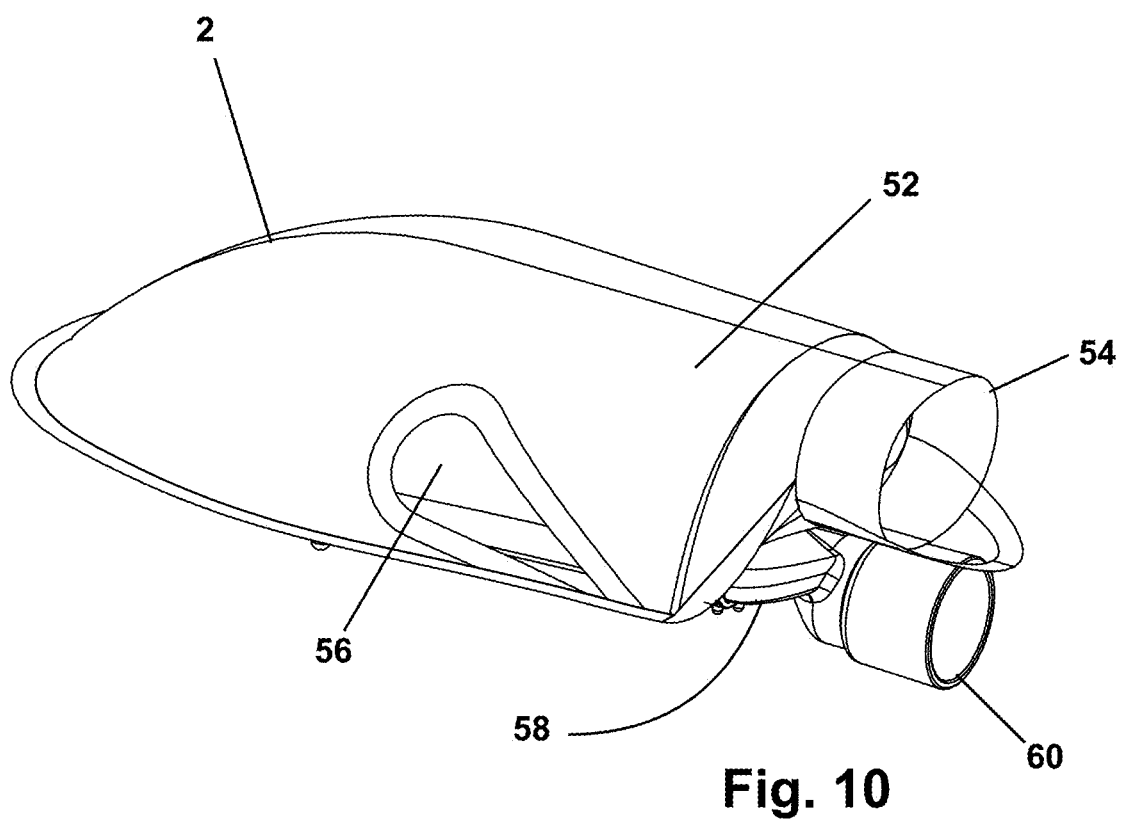
FIG. 10 is a perspective view of an assembled mitt.
Figure 11:
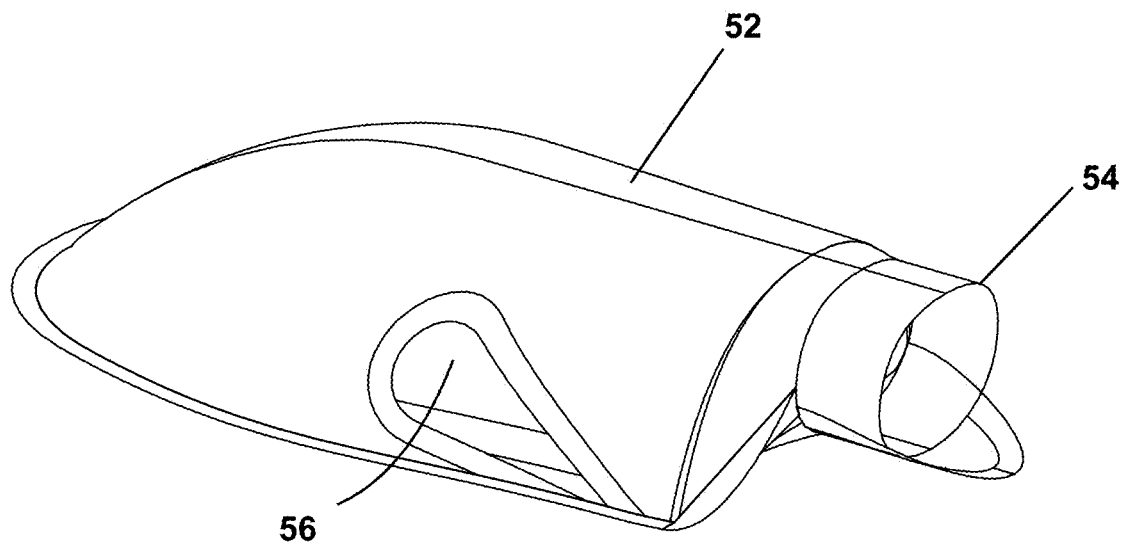
FIG. 11 is a perspective view of the fabric cover for the mitt.

FIG. 10 shows the assembled mitt 2, comprising a hand-engaging portion 52 and a drying portion 58. FIG. 11 shows the hand-engaging portion separated from the drying portion 58. From FIGS. 10 and 11, the hand-engaging portion 52 of the mitt 2 includes a cuff 54 and a thumb opening 56. The thumb opening 56 optionally may appear on both the left and right sides of the mitt 2 so that the user can wear the mitt 2 interchangeably on either the user's left or right hand.

To operate the mitt 2, the user inserts his or her hand through the cuff 54 and his or her thumb out of the thumb opening 56. The hand-engaging portion 52 of the assembled mitt 2 of FIG. 10 is attached to the drying portion 58 and attaches the drying portion 58 to the user's hand. As the user moves his or her hand over a wet or damp pet 6, the hand-engaging portion 52 moves the drying portion 58 over the pet 6. The drying portion 58 is attached to the blower 4 by a tube 10 selectably attached to the drying portion 58 by a mitt tube connection 60.

Figure 12:
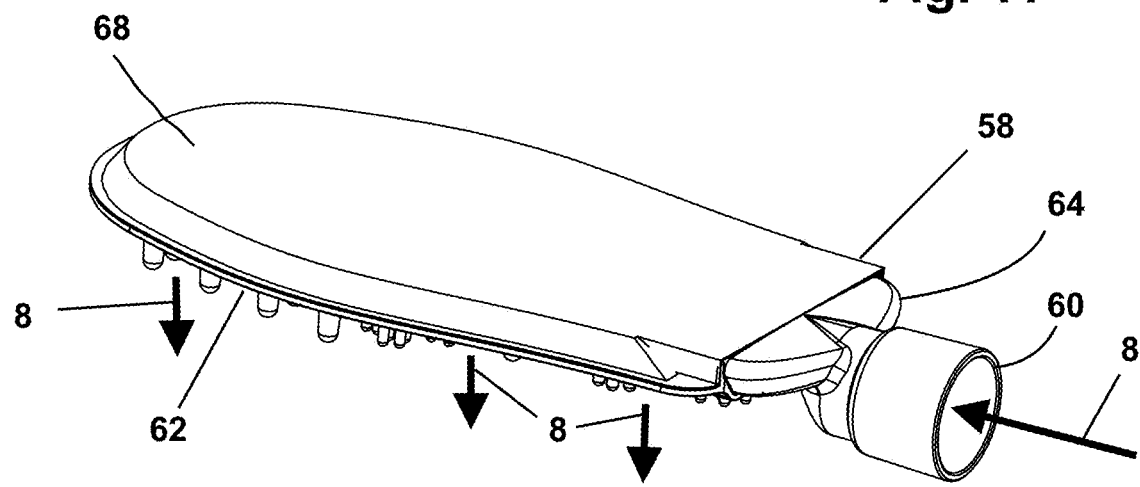
FIG. 12 is a perspective view of the drying portion of the mitt

FIGS. 12, 13A, 13B, 13C and 13D illustrate the construction and operation of the drying portion 58. FIG. 12 shows the drying portion 58 separate from the hand-engaging portion 52. Air 8 flows through tubes 10 from the blower 4 and enters the drying portion 58 through the mitt tube connection 60. The air 8 flows out through the interior volume 59 of the drying portion 58 to perforations 14 in the underside 12 of the perforated plate 62. The air 8 flows through the perforations 14 and out to the ambient air 80.

Figure 13A:
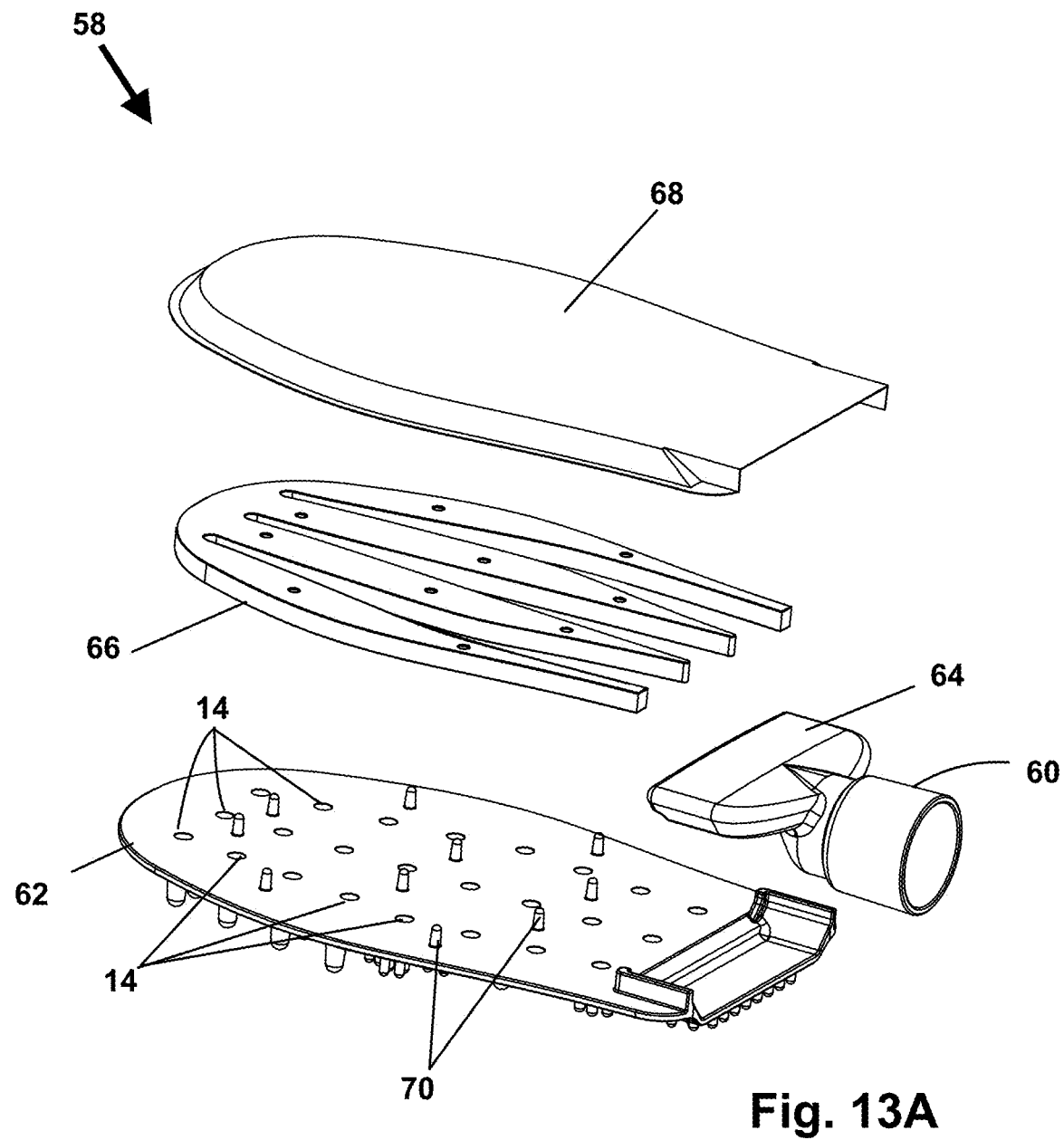
FIG. 13A is an exploded view of the drying portion of the mitt excluding the hand-engaging portion.

FIG. 13A is an exploded view of the drying portion 58. Air 8 is received by the mitt tube connection 60. A manifold 64 distributes the air 8 across the width of the perforated plate 62. A cover 68 cooperates with the perforated plate 62 to define the interior volume 59. A channel insert 66 is disposed between the perforated plate and the cover 68. A plurality of locator pins 70 engage mating holes in the channel insert 66 to locate the channel insert 66 with respect to the perforated plate 62 and to prevent dislocation of the channel insert 66 due to the flow of air 8. The perforated plate 62, channel insert 66 and cover 68 cooperate to define a plurality of channels 72 that convey air 8 from the manifold 64 and mitt tube connection 60 to each of the perforations 14.

Figure 13B:
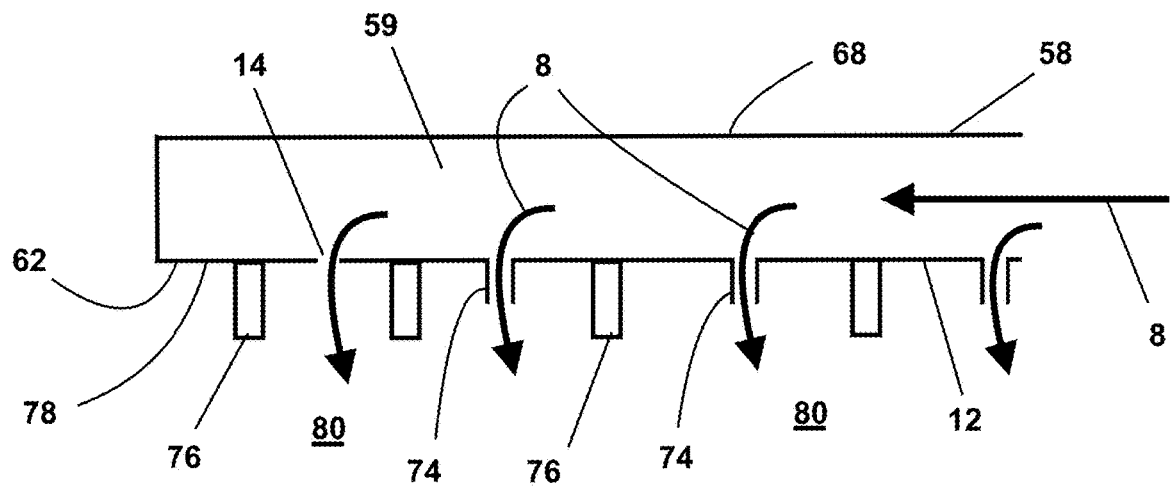
FIG. 13B is a schematic detail cross section of the drying portion of the mitt.

FIG. 13B is a schematic cross section of the drying portion 58 showing the perforated plate 62, cover 68 and the flow of air 8 through the perforations 14 from the interior volume 59 of the drying portion 58 to the ambient air 80 outside of the drying portion 58. The perforations 14 may be flush with the bottom surface of the perforated plate 62, as shown on the left side of FIG. 13B. Alternatively, a perforation 14 may take the form of a hollow pin 74, with the hollow pins 74 standing proud of the bottom surface 78 of the perforated plate 62, as shown by the remaining perforations 14 of FIG. 13B. The use of the hollow pins 74 as perforations 14 has the advantage that the hollow pins 74 and hence the air 8 flowing through the hollow pins 74 penetrate below the top surface of the fur or hair of the pet 6, exposing more fur or hair to the air 8 and speeding the drying of the pet 6.

The perforated plate 62 also may include grooming bristles or pins 76 that depend from the bottom surface 78 of the perforated plate 62. The grooming bristles or pins 76 are not perforated and do not convey air 8 through the grooming bristles or pins 76. The grooming bristles or pins 76 serve to groom the fur or hair of the pet 6 in the same manner as a brush or comb to separate and align the strands of hair or fur of the pet 6. The grooming bristles or pins 76 allow air 8 from the perforations 14, 74 to better flow through and around the hair or fur of the pet 6. The grooming bristles or pins 76 may extend farther from the bottom surface 78 of the perforated plate 62 than the hollow pins 74 to act as stand-offs to separate the open ends of the hollow pins 74 from the skin of the pet 6.

Figure 13C:
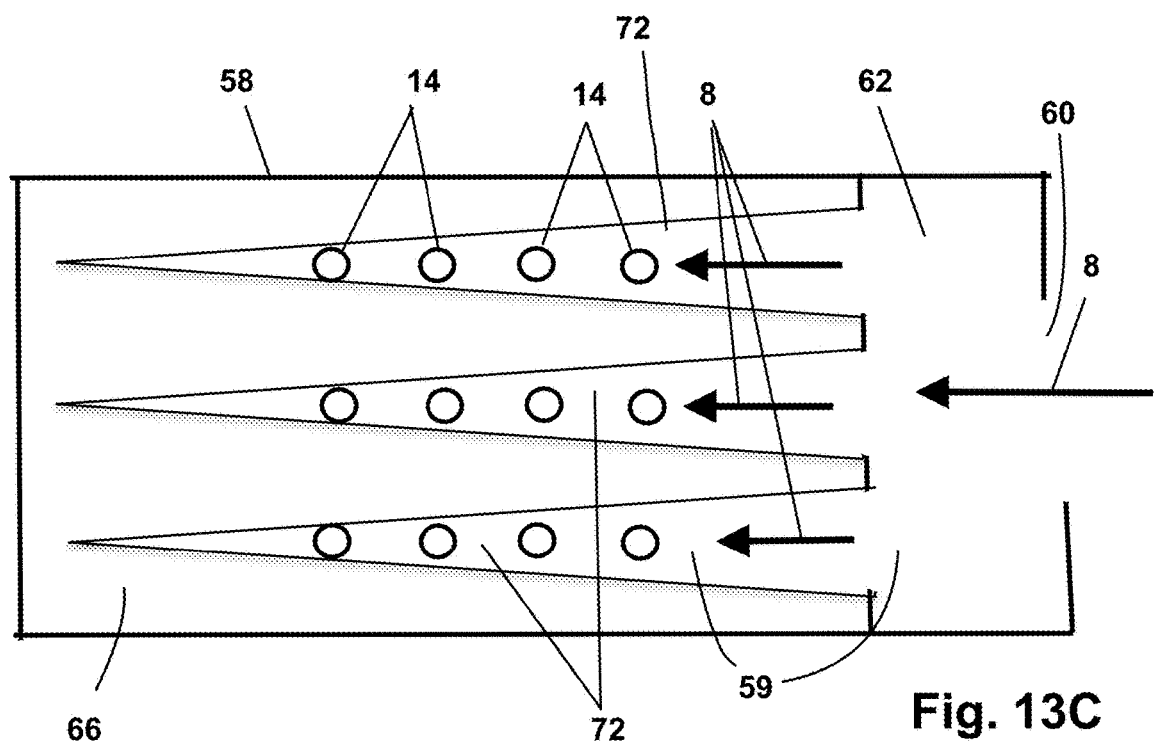
FIG. 13C is a schematic detail top view of the drying portion of the mitt with the cover removed.

FIG. 13C shows the channels 72 schematically in plan view with the cover 68 removed. The channels 72 narrow from the end proximal to the mitt tube connection 60 to the end distal to the mitt tube connection 60 to provide more even air flow rates at each location along the length of the channels 72 than would otherwise be the case. Each of the channels 72 defines a cross sectional area normal to the direction of air flow in the channel 72. The cross sectional area of each channel 72 decreases with increasing distance from the mitt tube connection 60.

Figure 13D:
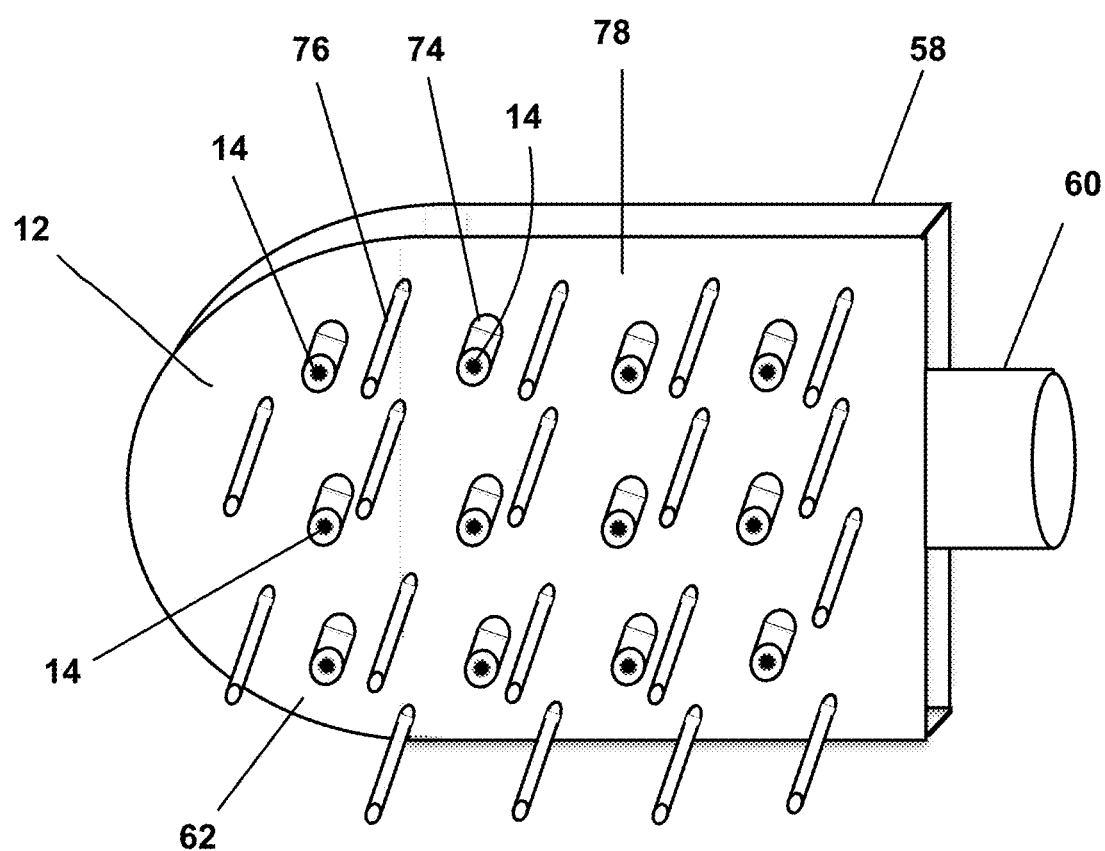

FIG. 13D is a schematic perspective view of the underside 12 of the drying portion 58 showing the perforated plate 62, the hollow pins 74 depending from the bottom surface 78 of the perforated plate 62 and the perforations 14 communicating through the hollow pins 74. FIG. 13D also shows the grooming bristles or pins 76 depending from the bottom surface 78 of the perforated plate 62 and extending further from the bottom surface 78 of the perforated plate 62 than the hollow pins 74. As noted, the hollow pins 74 extending beyond the bottom surface 78 of the perforated plate 62 allow the air 8 to be expelled below the surface of the fur or hair of the pet 6, increasing the hair or fur exposed to the air 8 and speeding the drying of the pet 6. The grooming bristles 76 act as stand-offs and reduce any likelihood of contact between the hollow pins 74 and the skin of the pet 6, preventing injury to the skin of the pet 6 due to the expelled air 8. As the user passes the mitt 2 over the pet 6, the grooming bristles 76 align and separate the strands of fur or hair of the pet 6, allowing better penetration of air 8 through the fur or hair than would otherwise be the case. As noted above for FIG. 13B, one or more of the perforations 14 may be flush with the bottom side 78 of the perforated plate 62 rather than communicating through the hollow pins 74.

The perforated plate 62, channel insert 66 and cover 68 may be composed of any suitable materials, such as rubber for the perforated plate 62, polyethylene foam for the channel insert 66 and polyvinylchloride for the cover 68. Any other suitable materials for any component are contemplated by the invention.

FIGS. 14 through 17 illustrate connection of the mitt 2 to the tube 10. FIGS. 14 and 15 illustrate a pair of mitts 2, a pair of tubes 10 and the tube connection 20 that splits the air flow from the blower 4 into the two tubes 10. FIG. 14 shows the mitts 2, tubes 10 and tube connection 20 attached. The blower 4 can direct the flow of air 8 through both tubes 10 and both mitts 2 simultaneously so that the user may use both hands to dry the pet 6. FIG. 15 is a partial exploded view that shows the mitts 2, tubes 10 and tube connection 20 separated. FIGS. 16 and 17 are similar to FIGS. 14 and 15 except that FIGS. 16 and 17 address a single mitt 2 and single tube 10.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The following are the numbered elements included in the drawings and specification.

2 mitt
4 blower
6 pet
8 air
10 tube
12 underside of the mitt
14 perforations in the underside
16 top side of the blower
18 inlets
20 tube connections
22 temperature and air speed control
24 strap
26 bottom side of the blower
28 motor and heater housing
30 reinforcing ribs
32 feet
34 upper portion of the motor and heater housing
36 lower portion of the motor and heater housing
38 decorative trim panel
40 air flow path
42 impeller
44 motor
46 heating element
48 resilient dampeners
50 fasteners
52 hand-engaging portion of the mitt
54 cuff
56 thumb opening
58 drying portion of the mitt
59 interior volume
60 mitt tube connection
62 perforated plate
64 manifold
66 channel insert
68 cover
70 locator pins
72 channel
74 hollow pin
76 grooming bristles or pins
78 bottom surface of the perforated plate
80 ambient air
82 clips
84 power cord

I claim:

1. An apparatus for drying a pet, the apparatus comprising:
   a. a blower, the blower being configured to generate a flow of air;
   b. a tube, the tube being configured to receive the flow of air from the blower and to convey the air within the tube;
   c. a mitt, the mitt defining an interior volume, the interior volume being configured to receive the flow of air from the tube, the mitt defining a plurality of perforations communicating from the interior volume to an ambient air, the perforations being configured to convey the flow of air from the interior volume into the ambient air;
   d. a hand engaging portion defined by the mitt, the hand-engaging portion being configured to receive a hand of a user and to selectably retain the mitt on the hand of the user, the hand of the user not being disposed within the interior volume when the hand engaging portion selectably retains the mitt on the hand of the user;
   e. a drying portion defined by the mitt, the drying portion being attached to the hand-engaging portion and selectably retained on the hand of the user by the hand-engaging portion, the drying portion defining the interior volume, the drying portion comprising a perforated plate and a mitt tube connection, the perforated plate defining the plurality of perforations, the mitt tube connection being configured for connection to the tube and to receive the flow of air from the tube, the mitt tube connection being configured to convey the flow of air to the interior volume, wherein the interior volume defines a plurality of channels, each of the plurality of channels being configured to convey the flow of air from the mitt tube connection to two or more of the perforations, each of the channels having a cross sectional area normal to the flow of air through the channels, the cross sectional area of each of the channels tapering from a larger cross sectional area proximal to the mitt tube connection to a smaller cross sectional area distal to the mitt tube connection.

2. The apparatus of claim 1 wherein the perforated plate defines a bottom surface, at least one of the perforations being flush with the bottom surface.

3. The apparatus of claim 1 wherein the perforated plate defines a bottom surface, at least one of the perforations being defined by a hollow pin, the hollow pin extending from the bottom surface in a direction opposite to the hand of the user when the mitt is selectably retained on the hand of the user, the hollow pin communicating between the interior volume and the ambient air, whereby the flow of air moves through the hollow pin from the interior volume to the ambient air.

4. The apparatus of claim 3, the apparatus further comprising: a plurality of grooming bristles or pins, the grooming bristles or pins extending from the bottom surface of the perforated plate in the direction opposite to the hand of the user when the mitt is selectably retained on the hand of the user, the grooming bristles or pins not being configured to transmit air from the interior volume to the ambient air, whereby the grooming bristles or pins align and separate the fur or hair of the pet while the flow of air from the hollow pins dries the fur or hair.

5. The apparatus of claim 4 wherein the grooming bristles or pins extend farther than the hollow pins from the bottom surface of the perforated plate, whereby the grooming bristles or pins act as stand-offs to separate the hollow pins from a skin of the pet.

6. The apparatus of claim 1, the drying portion of the mitt further comprising: a mitt tube connection, the mitt tube connection being configured for connection to the tube and to receive the flow of air from the tube, the mitt tube connection being configured to convey the flow of air to the interior volume.

7. The apparatus of claim 1, the drying portion further comprises:
   a. a cover, the cover and the perforated plate cooperating to define the interior volume;
   b. a channel insert, the channel insert being disposed between the perforated plate and the cover, the channel insert, the perforated plate and the cover cooperating to define the channels.

8. The apparatus of claim 1 wherein the blower comprises: a heater to selectably warm the flow of air.

9. The apparatus of claim 1, further comprising:
   a. a pair of mitts wherein the mitt is one of the pair of mitts;
   b. a pair of tubes wherein the tube is one of the pair of tubes, the blower being configured for connection to both of the tubes simultaneously, whereby the blower selectably directs the flow of air through both tubes and both mitts simultaneously.

* * * * *